United States Patent
Prieto et al.

(10) Patent No.: US 10,505,802 B2
(45) Date of Patent: Dec. 10, 2019

(54) ADAPTIVE SUBSCRIBER-DRIVEN RESOURCE ALLOCATION FOR PUSH-BASED MONITORING

(71) Applicant: Cisco Technology, Inc., San Jose, CA (US)

(72) Inventors: Alberto Gonzalez Prieto, Mountain View, CA (US); Alexander L. Clemm, Los Gatos, CA (US); Eric Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 525 days.

(21) Appl. No.: 14/930,281

(22) Filed: Nov. 2, 2015

(65) Prior Publication Data
US 2017/0126486 A1    May 4, 2017

(51) Int. Cl.
*H04L 12/24*    (2006.01)
*H04L 29/08*    (2006.01)
*H04L 12/18*    (2006.01)

(52) U.S. Cl.
CPC ........ *H04L 41/082* (2013.01); *H04L 12/1859* (2013.01); *H04L 41/0886* (2013.01); *H04L 67/26* (2013.01)

(58) Field of Classification Search
CPC ... H04L 12/1859; H04L 67/26; H04L 41/082; H04L 41/0886
USPC ......................................................... 709/221
See application file for complete search history.

(56) References Cited

U.S. PATENT DOCUMENTS

| | | | | | |
|---|---|---|---|---|---|
| 6,976,251 | B2 * | 12/2005 | Meyerson | ............... | G06F 8/65 717/173 |
| 8,504,004 | B2 * | 8/2013 | Austin | ............... | H04W 4/001 455/414.1 |
| 8,555,157 | B1 * | 10/2013 | Fu | ............... | G06F 17/30893 715/201 |

(Continued)

OTHER PUBLICATIONS

Durai, B. et al., "Adaptive Push Based Data Collection Method for Online Performance", National Conference on Communications (NCC), dated Jan. 28-30, 2011, 5 pages.

(Continued)

*Primary Examiner* — Tonia L Dollinger
*Assistant Examiner* — Adam A Cooney
(74) *Attorney, Agent, or Firm* — Lee & Hayes, P.C.

(57) ABSTRACT

A method and apparatus for network resource allocation is provided. In some embodiments, the method comprises determining a subscriber limit rate at which a subscriber computer can process updates received from a plurality of publisher computers, wherein each of the updates comprises an electronic digital message received over a computer network; determining, for each publisher computer of the plurality of publisher computers, a not-to-exceed rate of updates sent to the subscriber computer and storing a plurality of the offered rates; determining by the subscriber computer, for each publisher computer of the plurality of publisher computer, a utility of updates sent by the publisher computer and storing a plurality of the utilities; assigning to each publisher computer of the plurality of publisher computers a publisher limit rate at which the respective publisher computer sends updates to the subscriber computer using the offered rate and the utility of updates of the respective publisher computer.

12 Claims, 3 Drawing Sheets

(56) References Cited

U.S. PATENT DOCUMENTS

| | | | | |
|---|---|---|---|---|
| 9,055,385 B1* | 6/2015 | Singh | ................... | H04W 4/206 |
| 2010/0306365 A1* | 12/2010 | Gale | ...................... | H04L 51/14 |
| | | | | 709/224 |
| 2012/0078917 A1* | 3/2012 | Gradin | .............. | G06F 17/30368 |
| | | | | 707/748 |
| 2014/0067940 A1* | 3/2014 | Li | .......................... | H04L 67/22 |
| | | | | 709/204 |
| 2014/0188840 A1* | 7/2014 | Agarwal | ........... | G06F 17/30321 |
| | | | | 707/711 |
| 2015/0019618 A1* | 1/2015 | Brookfield | ........ | G06F 17/30899 |
| | | | | 709/202 |
| 2016/0261395 A1* | 9/2016 | Agarwal | ................ | H04L 67/06 |

OTHER PUBLICATIONS

European Patent Office, "International Preliminary Report on Patentability", in application No. PCT/US2016/049518, dated May 8, 2018, 9 pages.

European Claims in application No. PCT/US2016/049518, dated May 2018, 6 pages.

* cited by examiner

ADAPTIVE SUBSCRIBER-DRIVEN RESOURCE ALLOCATION FOR PUSH-BASED MONITORING

TECHNICAL FIELD

The present disclosure generally relates to computer programs used in network management. The disclosure relates more particularly to programmed techniques for monitoring computers in a network with automatic management of update rates and related resources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In networked environments, it is important to have information detailing a state of various entities in the networked environment. Entities may include routers, switches, and other elements of internetworking infrastructure. Monitoring entities, including monitoring applications, typically obtain updates from the entities being monitored using a pull-based approach or a push-based approach. In pull-based approaches, the monitoring application explicitly polls the monitored entity every time it desires more data such as an update of the state. The monitored entity is reactive. If the monitoring entity stops polling, the monitored entity will not send any more data.

Push-based approaches follow a publisher/subscriber paradigm where each monitored entity is a publisher, and the monitoring entity is the subscriber. The subscriber conceptually specifies what data it is interested in, and how it wants to receive it, and thus subscribes to specified updates. The publisher sends or publishes data or updates to the subscriber based upon the specification.

In pull-based approaches using polling, the monitoring entity has complete control on usage of resources, such as the amount of memory or disk storage used to store updates. If the monitoring entity is running out of storage or updates, then the monitoring entity can request fewer updates or stop requesting updates. In many cases, successive requests made by the monitoring entity may turn out to be redundant and wasteful, because the underlying data did not change from one request to the other. Polling solutions offer challenges with regards to resilience and synchronization of data, which requires timing that is precisely synchronized across multiple devices. Synchronized timing is needed to ensure data is retrieved at the same instance in time to make it comparable, and to avoid issues with regard to jitter and delay variations of requests which might cause data to be aggregated over intervals that are not evenly spaced. And, when the state of the monitored entity does not change, multiple polls result in no additional information for the monitoring entity.

Push-based approaches can be more efficient in resource usage by avoiding redundant requests from the monitoring entity. Further, no separate message is sent to initiate each message exchange. Push-based approaches can be more timely, as changes can be pushed when they occur without needing to wait for the next polling interval. Synchronization is greatly facilitated and robustness is improved as missing or delayed polling requests are a non-issue. All these properties make pushing a highly desirable approach.

In "on-change" or periodic push-based approaches, subscribers are notified when the state of the monitored entity changes, or when it changes significantly. "On-change" approaches may be more efficient in resource usage since each message exchange provides the monitoring entity with additional information. A challenge of such approaches is that under certain scenarios, a high rate of updates can result which in the worst case can overwhelm a subscriber and lead do problems such as indiscriminate dropping of data. For example, a subscription can concern a "subtree", and a subscriber may not always know the number of data items in the subtree, hence the volume of data to expect from updates. Likewise, subscriptions can involve filters, and subscribers may not be able to predict in advance how many nodes or data items meet the filter criteria.

DETAILED DESCRIPTION

Figure 1:
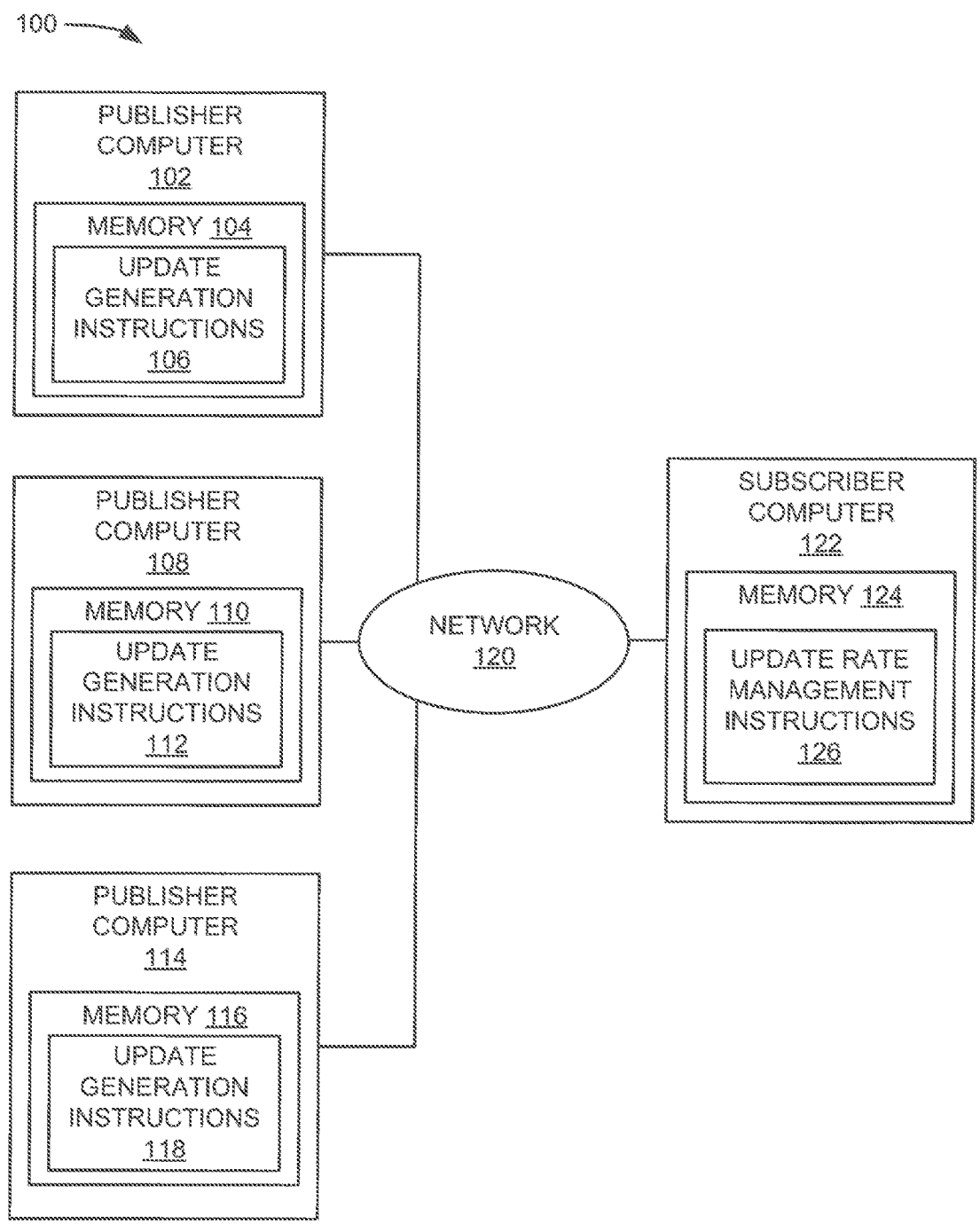
FIG. 1 is a block diagram of a networked computer environment according to various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

For purposes of clarity and conciseness, in some instances this disclosure refers to certain data values, which are stored and used in electronic digital form in memory or non-volatile storage, using labels that represent concepts or abstractions. An example is "update." However, each instance in this detailed description of using or referring to an abstract item or concept is intended to encompass one or more electronically digitally stored data values that represent or correspond to the specified abstract item or concept. In other words, the disclosure is directed to practical applications of the concepts described herein using the particular computers, computer memory, computer storage, and computer communications that are described herein, and is not intended to encompass all means of implementing the abstract items or concepts nor to encompass the abstract items or concepts themselves.

This description follows the following outline:
1.0 General Overview
2.0 System Overview
  2.1 Update Rate Management Instructions
3.0 Algorithm Overview
  3.1 Forecasting Algorithm
  3.2 Utility Algorithm
  3.3 Priority Levels
4.0 Hardware Overview
  1.0 General Overview In one embodiment, a subscriber computer system provides an improvement in control of rates at which a plurality of publisher computer systems send digital electronic update messages to the subscriber computer system comprising:

one or more processors; a non-transitory computer-readable storage medium storing instructions which when executed by the one or more processors, cause the one or more processors to perform: using the one or more processors, determining for a subscriber computer system a subscriber limit rate at which the subscriber computer system can process updates received from a plurality of publisher computer systems, and storing the subscriber limit rate in computer memory, wherein each of the updates comprises an electronic digital message received over a computer network; using the one or more processors, determining, for each publisher computer system of the plurality of publisher computer systems, an offered rate of updates sent to the subscriber computer system and storing a plurality of the offered rates in the computer memory; using the one or more processors, determining, for each publisher computer system of the plurality of publisher computer systems, a utility of updates sent by the publisher computer system and storing a plurality of the utilities in the computer memory; using the one or more processors, assigning to each publisher computer system of the plurality of publisher computer systems a publisher limit rate at which the respective publisher computer system sends updates to the subscriber computer system using the offered rate and the utility of updates of the respective publisher computer system.

In another embodiment, a resource allocation method providing an improvement in control of rates at which a plurality of publisher computer systems send digital electronic update messages to the subscriber computer system comprises: using one or more processors, determining for a subscriber computer system a subscriber limit rate at which the subscriber computer system can process updates received from a plurality of publisher computer systems, and storing the subscriber limit rate in computer memory, wherein each of the updates comprises an electronic digital message received over a computer network; using the one or more processors, determining, for each publisher computer system of the plurality of publisher computer systems, an offered rate of updates sent to the subscriber computer system and storing a plurality of the offered rates in the computer memory; using the one or more processors, determining, for each publisher computer system of the plurality of publisher computer systems, a utility of updates sent by the publisher computer system and storing a plurality of the utilities in the computer memory; using the one or more processors, assigning to each publisher computer system of the plurality of publisher computer systems a publisher limit rate at which the respective publisher computer system sends updates to the subscriber computer system using the offered rate and the utility of updates of the respective publisher computer system.

Other embodiments, aspects and features will become apparent from the following description, the drawings and the claims.

2.0 System Overview

In typical systems using existing "on-change" pushing techniques, a subscriber computer receiving the updates does not have control over the rate of updates it receives. The rate of updates in such a system is dependent on the rate of changes in the publisher computers. However, because of resource constraints, the subscriber computer cannot handle an unlimited number of updates or an abnormally high rate of updates. Examples of resource constraints include storage or processing power constraints. Particular constraints may exist for Internet of Things (IoT) devices that use limited-power processors or have small memory space. Further, in some instances, a publisher computer can be limited in the number of updates that it can send by network bandwidth limits of the network to which it is connected and via which it communicates the updates to the subscriber computer. The systems and methods described herein provide the subscriber computer the ability to allocate its capacity for handling updates and the ability to dictate or control the rate of updates that are sent to it by each of the publisher computers.

The number of updates may vary and might be greater than the number of updates expected by the subscriber. Factors that influence the number of updates, and might result in a greater number of updates than expected, include rates of change that are faster than expected where each change results in its own change update, or greater number of data items than expected, included data items that are dynamically added, for example, number of routing table entries, or entries in an Access Control List (ACL), or subinterfaces on Virtual Machines. By controlling the rate of updates, the subscriber computer may prevent becoming overwhelmed by a high rate of updates while more efficiently and effectively managing the use of memory and CPU cycles. In instances where there is limited network bandwidth at a particular publisher computer, the subscriber computer may control the number of updates so as to not exceed the available network bandwidth available to the particular publisher computer. In some instances, the subscriber computer may control the number of updates so as to not exceed the memory space or processing power of the publisher computer. The constraint may be on the aggregate of rates (vs. per publisher) if, for example, the paths between publishers and subscriber overlap. Because the subscriber computer can control the rate of updates it receives from each of the publisher computers, the subscriber computer may subscribe to a greater number of publisher computers than it would otherwise be able to subscribe. The subscriber computer may assign different publisher rate limits to each of the publisher computers. In these embodiments, the publisher supports a feature that allows subscribers to configure a "not-to-exceed" rate, beyond which updates will not be sent from the publisher to the subscriber. If more updates occur than can be sent without exceeding the rate, rather than indiscriminately dropping updates at random, those updates that are of the lowest priority/utility may be dropped first so that updates that are of higher priority/utility are sent to the subscriber.

The global not-to-exceed rate of the subscriber indicates the total number of updates that the subscriber can receive from all of the publishers. The global not-to-exceed rate is gated by processing capacity of the subscriber and may be adjusted if, for example, the subscriber has an architecture with elastic processing capacity. For example, a subscriber may utilize a distributed architecture in which processing capacity can be increased or decreased by adding or removing virtual machines (VMs). As capacity of the subscriber varies, so does the global "not-to-exceed rate" of the subscriber. In some instances, the global "not-to-exceed" rate may be adjusted as the subscriber acquires knowledge of its processing capabilities. The subscriber may not be able to make this determination in advance so that as the subscriber determines that it has enough capacity to handle more requests even when the global not-to-exceed rate is reached, it may adjust the not-to-exceed rate upwards.

The publisher computers each have an assigned individual not-to-exceed rate that is assigned by the subscriber computer. The individual rate is gated by the expected utility of the updates. The subscriber assigns individual rates out of the overall "budget" based on the global not-to-exceed rate.

As the utility of updates of devices in the network fluctuates, so do the individual not-to-exceed rates. For example, an area of the network may be determined to be prone to attack, requiring closer monitoring. In that case, utility of updates from that part of the network may increase, and hence the individual rates of those devices may be adjusted accordingly. Likewise, if additional devices enter the network, while the global not-to-exceed rate remains unchanged, local rates may need to be adjusted downwards to "make room" for additional updates from the new devices.

FIG. 1 is a block diagram of a networked computer environment 100 according to various embodiments. The networked computing environment 100 comprises one or more publisher computers 102, 108, 114 coupled via a network 120 with a subscriber computer 122.

The publisher computer 102, publisher computer 108, and publisher computer 114 comprise, respectively, memory 104, memory 110, and memory 116. The memory 104, 110, 116 store update generation instructions 106, update generation instructions 112, and update generation instructions 118, respectively. The update generation instructions, in turn, are programmed to generate one or more updates to be sent to the subscriber computer 122. The updates themselves include one or more data values that describe the state of a monitored entity. The updates and the subscriptions refer to management data, such as operational data and configuration data that is maintained by a device. In some embodiments, this management data may be described using YANG data models; the instantiation of that data on a device may be referred to as a "YANG Datastore". The monitored entity may be the publisher computer 102 or may be another computer that sends updates to the publisher computer 102. An example of the publisher computer 102 is any router, switch, other infrastructure element, a device that hosts a Netconf or Restconf server, or other special-purpose computer or programmed general-purpose computer that produces alerts, events, or update messages, records or other datasets that may be useful to a subscriber computer. In some instances, the publisher computer 102 is an Internet of Things (IoT) device having limited network bandwidth, memory space, or processing power.

The monitored entity may be a physical or logical entity in the device that is subject to monitoring or management, for example a set of interfaces, along with a set of parameters for each interface. A monitored entity may be any type of networked device, including, but not limited to, routers, switches, firewalls, printers, scanners, computing devices (including servers), and telephones. In general, a monitored entity can be represented as a data node or a subtree of data nodes in a YANG datastore. Accordingly, the example system of FIG. 1 can be used to send updates of YANG data nodes, for example. In some instances, the monitored entity is an Internet of Things (IoT) device having limited network bandwidth, memory space, or processing power.

The subscriber computer 122 comprises a computer device that is specifically programmed to receive and process state data of the monitored entities that it receives from the publisher computer 102, the publisher computer 108, and the publisher computer 114. In some instances, the subscriber computer 122 can be a networking device with compute capabilities, a controller, or other computing machine.

The subscriber computer 122 comprises tangible memory 124 that is programmed with update rate management instructions 126. When executed by one or more processors, the update rate management instructions 126 determine, for each of the publisher computers, a maximum rate of updates that can be sent to the subscriber computer 122 by the publisher computer.

2.1 Update Rate Management Instructions

The rate management instructions 126 allocates update rates to the publisher computer 102, the publisher computer 108, and the publisher computer 114 to maximize the utility obtained subject to a given upper bound for total update rate at the subscriber computer 122. The update rate management instructions 126 comprise instructions that are used to forecast the rate of updates that each publisher computer is able to send and the utility of the updates sent by the publisher computer. The update rate management instructions 126 may be programmed based on an assumption that the publisher computer 102, the publisher computer 108, and 114 operate in a steady state.

3.0 Algorithm Overview

Figure 2:
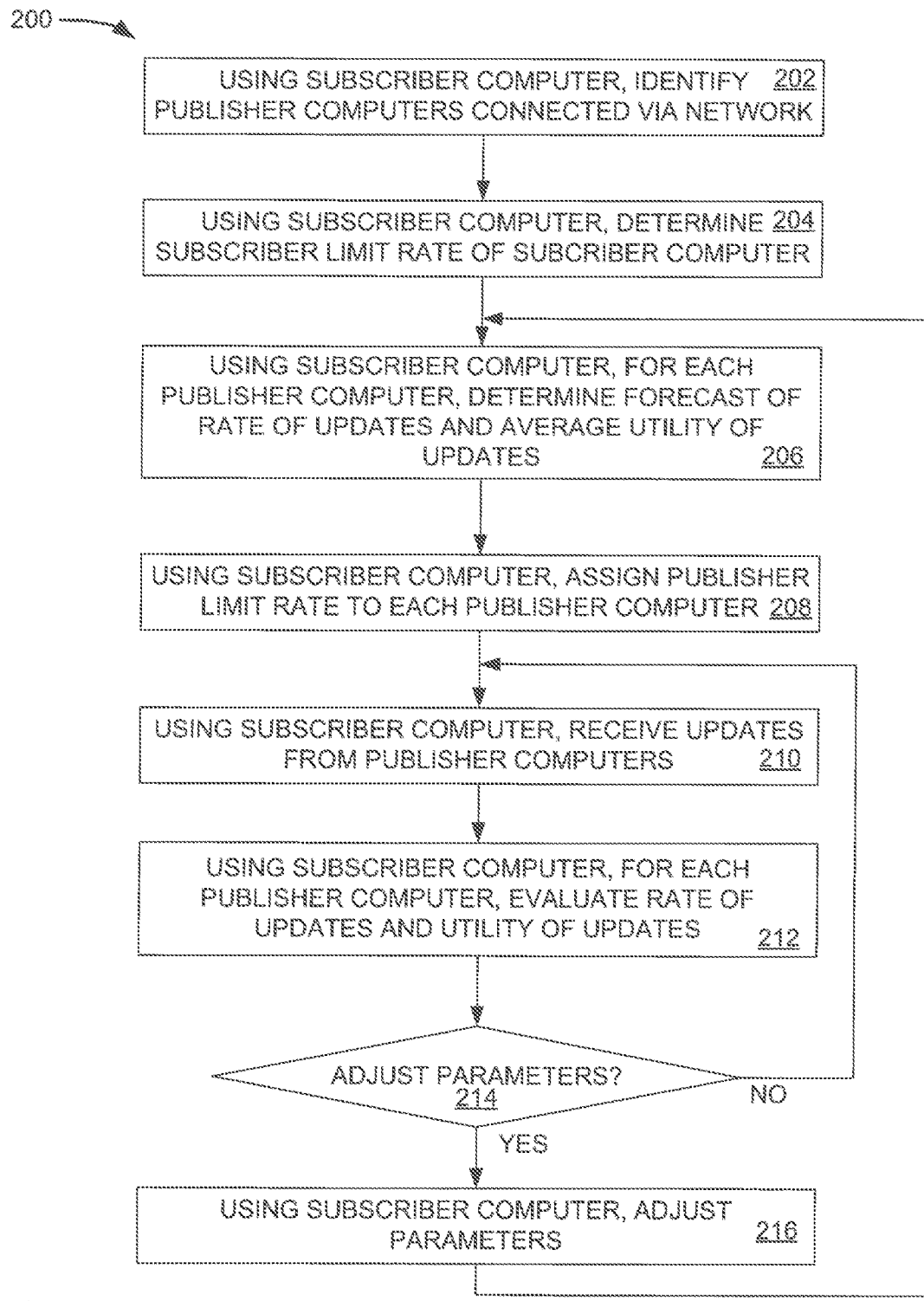
FIG. 2 is a flowchart of an algorithm or process for resource allocation according to various embodiments.

FIG. 2 is a flowchart of an algorithm 200 or process for resource allocation according to various embodiments. The algorithm 200 may be performed when the update rate management instructions 126 are accessed from memory 124 and executed by the subscriber computer 122. The algorithm 200 comprises solving a linear programming optimization problem and is performed repeatedly in a closed-control loop.

In an operation 202, the subscriber computer 122 is programmed to identify one or more publisher computers connected via the network 120 that send updates to the subscriber computer 122. The publisher computers can themselves be monitored entities or may act as a clearing house for updates sent by other monitored entities that are not in direct communication with the subscriber computer 122. In the embodiment depicted in FIG. 1, the publisher computer 102, the publisher computer 108, and the publisher computer 114 may be identified by the subscriber computer 122 using network discovery techniques. In some embodiments, the list of publishers is known to the subscriber computer 122 since it has subscribed to them. The subscriber computer 122 may establish a connection using a handshake protocol such as the TCP/IP protocol. An identifier of each of the identified publisher computers is stored in memory as a retrievable data value. One example of an identifier that may be used is an IP address.

In some embodiments, publisher computers may be added or removed from the group of computers that send updates to the subscriber computer 122. The added or removed publisher computer 114 may notify the subscriber computer 122 of the change or may be added or removed by the subscriber computer 122 itself. If the publisher computer is removed, the publisher limit rate is set to zero. An added publisher computer 114 may be assigned an initial default publisher limit rate. In these embodiments, the operation 202 may be performed off-line, independently of the other operations of the algorithm 200. The subscriber computer 122 assigns the publisher computer a new publisher limit rate when it performs the operation 206.

In an operation 204, the subscriber computer 122 is programmed to determine a subscriber limit rate of the subscriber computer 122. The subscriber limit rate may be referred to as the global not-to-exceed rate. The subscriber limit rate is the maximum rate of updates that the subscriber computer 122 can process. The subscriber limit rate is greater than or equal to the sum of publisher limit rates assigned to the publisher computer 102, the publisher computer 108, and the publisher computer 114. The subscriber limit rate may be stored in memory 124 as a retrievable data value.

In embodiments where the capacity of the subscriber computer 122 may change by adding or removing VMs, the subscriber limit rate is adjusted as the subscriber computer 122 determines that its capacity has changed. The adjustment is made according to the resources of the added or removed VMs and/or the change in overall capacity of the subscriber computer 122. The capacity of the added or removed VMs may result in a change in network bandwidth, memory space, and/or processing power of the subscriber computer 122. In these embodiments, the operation 204 may be performed off-line, independently of the other operations of the algorithm 200. The updated subscriber limit rate is used when the subscriber computer 122 performs operation 206.

In an operation 206, the subscriber computer 122 is programmed to determine a forecast for each of the publisher computers. The forecast comprises two determinations: a forecast of an offered rate of updates by the publisher computer and a forecast of an average utility of the updates. From the forecasts, in an operation 208, the subscriber computer 122 assigns a publisher limit rate of updates to each of the publisher computers identified in the operation 202.

By assigning variables to each forecast and rate of the publisher computers, the problem can be stated mathematically. For example, C is the subscriber limit rate of the operation 204. C may be influenced by the set of subscribers, such as a network capacity that connects the subscriber computer 122 with the publisher computer 102, the publisher computer 108, and the publisher computer 114. $O'_j$ is a forecasted for the offered rate of publisher computer j during a next time window. $V'_j$ is a forecast for the average utility of the updates of the publisher computer j during the next time window. The solution to the problem is the publisher rate limit $R_j$ for the publisher computer j. Each of these values may be stored in memory 124 and is retrievable by the subscriber computer 122.

Stated mathematically, the linear programming optimization problem is:

Given $C$, $O'_j$ and $V'_j$, maximize $\Sigma(R_j * V'_j)$ subject to $\Sigma R_j \leq C$ where $R_j \leq O'_j$ The linear optimization problem therefore first depends on forecasting the offered rate of updates, $O'_j$, and the average utility of the updates, $V'_j$, for each of the publisher computers.

3.1 Forecasting Algorithm

To forecast the offered rate of updates, $O'_j$, and the average utility of the updates, $V'_j$, for each of the publisher computers, the subscriber computer assumes that the respective publisher computers are operating in a steady state. By assuming a steady state, the prediction for the behavior of the publisher computer will be about the same as the behavior of the publisher computer during the previous window. Stated another way, it is assumed that the behavior of the publisher computer will not change or undulate from time window to time window.

To forecast the behavior of the publisher computers in steady state, the subscriber computer 122 accesses one or more records containing a set of updates sent by the publisher computer, j, during the previous time window, referred to as $U_{ij(t-1)}$ where (t−1) is the previous time window and where i is a value from 1 to n. The subscriber computer 122 accesses from memory, value $R_{j(t-1)}$, the rate assigned to the publisher computer, j, in the previous time window and value $S_{j(t-1)}$, the actual rate at which the publisher computer, j, sent updates to the subscriber during the previous time window.

Stated mathematically, the rates are determined by solving this optimization problem:

Given $U_{ij(t-1)}$, maximize $\Sigma(R_{j(t)} * V_{j(t-1)})$ subject to that $\Sigma(R_{j(t)}) \leq C$ $R_{j(t)} \leq S_{j(t-1)} * (1+\alpha)$ if $S_{j(t-1)} > R_{j(t-1)} * \beta$ $R_{j(t)} \leq S_{j(t-1)}$ if $S_{j(t-1)} \leq R_{j(t-1)} * \beta$ where $\alpha$ (alpha) is an algorithm parameter that controls the maximum increase in the allowed rate of a publisher computer between time windows and $\beta$ (beta) is an algorithm parameter that controls the sensitivity of the subscriber computer 122 to publisher computers not using the assigned resources. The parameters $\alpha$ and $\beta$ are retrievable data values stored in memory 124. For example, if a publisher computer has sent updates at a rate that is less than a threshold ratio, expressed as $\beta$, of its previous publisher limit rate, the new publisher limit rate assigned to the publisher computer cannot exceed the offered rate of the previous time window, $O_{j(t-1)}$.

The parameters $\alpha$ and $\beta$ can be set to default values and are modifiable by a network administrator. In some embodiments, the parameter a may be changed if the utility of the updates from one or more of the publisher computers are changing more than expected from time window to time window. The utility may change in this way if, for example, the published computer is attacked or becomes infected with malicious code. The $\alpha$ parameter may be increased so that the subscriber computer 122 receives more updates about the attack. Once the attack is resolved, the $\alpha$ parameter may be decreased from the increased value. The $\beta$ parameter may be changed if, for example, the publisher computers are sending a decreased number of updates due to external factors, such as time of day, seasonality, or being taken down for maintenance or repairs.

3.2 Utility Algorithm

The subscriber computer 122 performs a utility algorithm to determine the average utility of the updates sent by a particular publisher computer during a previous time period. Because the publisher computer is assumed to be in a steady state, the forecast of the average utility of updates is roughly equal to, and may be interchangeable with, the average utility of previous updates received from the publisher computer. The average utility of updates sent by a publisher computer, j, is the arithmetic mean of the utility of the respective updates received from the publisher computer, j. Instead of the arithmetic mean, other statistical measures may be used in other embodiments including, but not limited to, median or mode. The arithmetic mean is a retrievable data value stored in memory 124.

The utility of an update may be determined based on three measures. $\Delta$ (delta) is a difference between the value of a data element reported in the update and a last known value that was previously reported to the subscriber computer 122 for data element. To determine the utility of an update, the absolute value of $\Delta$ may be used. Cr is a value set to indicate that the data element was created and that the previous update indicated it had been removed. Rm is a value set to indicate that the data element was removed and that the previous update indicated that it existed.

The subscriber computer 122 determines the utility of a particular update received from the publisher computer as:

$$|\Delta|(1+w_c Cr+w_r Rm)$$

where $w_c$ and $w_r$ are configurable weights that dictate the utility of the creation and removal events in the publisher computer and are retrievable data values stored in memory 124. The information used to determine utility of a particular update depends only on data included in the most recent update and the update preceding it. In another embodiment, more past data is used to determine the utility. The subscriber computer 122 may determine the average utility of the updates received from a particular publisher computer incrementally, as updates reach the subscriber computer 122. In some embodiments, a minimum utility rate can be assigned to publisher computers that send updates of minimal value.

The configurable weights $w_c$ and $w_r$ may be changed in response to, for example, publisher computers being added or removed. If a large number publisher computers are being removed within a time window, the weight $w_r$ may be changed to stabilize the forecasts for the remaining publisher computers. Likewise, if a large number publisher computers are being added within a time window, the weight $w_c$ may be changed to stabilize the forecasts for the existing publisher computers.

3.3 Priority Levels

In some embodiments, the updates may be associated with different priority levels. To accommodate different priority levels, the subscriber limit rate may be allocated among the priority levels. The subscriber computer 122 may perform algorithm 200 for each priority level using the subscriber limit rate allocation for the priority level.

In some embodiments, the publisher rate limit for each quality of service (QoS) level may be adjusted based on the requirements associated with the particular QoS levels. For example, parameters α and β may be adjusted so as to allow the publisher limit rate to be increased or decreased as needed.

Returning to FIG. 2, the subscriber computer 122, for each publisher computer, uses the forecasted offered rate of updates and the average utility of the updates received form the publisher computer to determine a publisher limit rate. In operation 208, each of the publisher computers of operation 204 is assigned a publisher limit rate. The subscriber computer 122 stores the publisher limit rate as a retrievable data value in memory 124 and sends the assigned publisher rate limit to the respective publisher computer.

In an operation 210, the subscriber computer 122 receives updates from the publisher computer 102, the publisher computer 108, and the publisher computer 114. The subscriber computer 122 may associate the updates received with a current time window. In an operation 212, the subscriber computer 122 is programmed to evaluate the rate of updates received and the utility of the updates.

In an operation 214, the subscriber computer 122 determines whether to adjust one or more parameters or to update the closed control loop formed by operations 206 through 212. The parameters that may be updated include α, β, $w_c$, and $w_r$. The closed control loop may be updated on a predictable basis at constant intervals. In other embodiments, the closed control loop is updated on demand. In still further embodiments, the closed control loop is updated when the subscriber computer 122 detects a substantial imbalance between publisher computers such that, some publisher computers send updates at a significantly lower rate than the assigned rate while other publisher computers consistently send updates at or near the assigned rate.

If the determination of the operation 214 is "yes", the subscriber computer 122 adjusts the parameters. The parameters may be adjusted to, for example, incorporate an additional publisher computer, to remove a publisher computer, to accommodate different priority levels or QoS levels, or the like.

The closed control loop may be updated if the steady state of the publisher computers is disrupted by one or more publisher computers leaving the steady state. The closed control loop can be updated by sending, to one or more of the publisher computers, an instantaneous publisher limit rate of zero, or other significantly reduced value. The publisher rate of zero instructs the receiving publisher computer to suspend all push updates or to suspend all push updates at a certain priority level.

Upon performance of the operations 214, the algorithm returns to the operation 210. Upon performance of the operations 216, the algorithm returns to the operation 206.

The subscriber computer performs the algorithm 200 to maximize the utility of the updates it receives form the publisher computers. The subscriber computer is limited to a subscriber limit rate of updates that it can receive from the publisher computers depending on its computer resources and available network bandwidth. In assigning the publisher limit rates, a distinction is made as to whether the assigned capacity is used or if some capacity has gone unused by the publisher computer. In some embodiments, the publisher limit rate of updates is based on CPU cycles or total quantity of updates. If some of the assigned capacity has gone unused, that capacity is re-assigned to other publisher computers. If a publisher computer uses all of its assigned capacity, the subscriber computer can assign it more capacity in the next time window.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
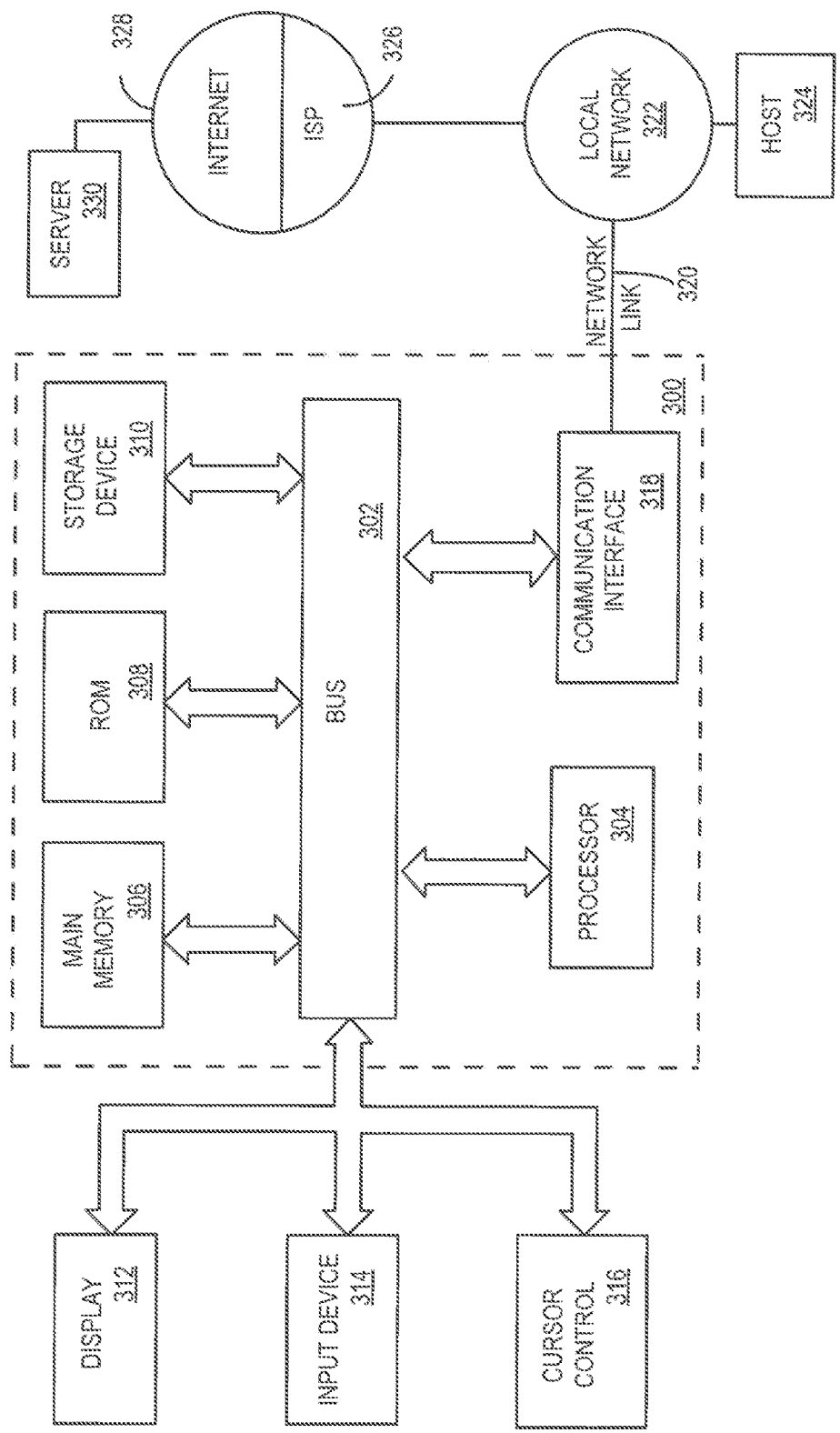
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A subscriber computer system providing control of rates at which a plurality of publisher computer systems send digital electronic update messages to the subscriber computer system comprising:

one or more processors;

a non-transitory computer-readable storage medium storing instructions which when executed by the one or more processors, cause the one or more processors to perform:

using the one or more processors, determining for a subscriber computer system a subscriber limit rate at which the subscriber computer system can process updates received from a plurality of publisher computer systems, and storing the subscriber limit rate in computer memory, wherein each of the updates comprises an electronic digital message received over a computer network;

using the one or more processors, determining, for each publisher computer system of the plurality of publisher computer systems, an offered rate of updates sent to the subscriber computer system and storing a plurality of the offered rates in the computer memory;

using the one or more processors, determining, for each publisher computer system of the plurality of publisher computer systems, a utility of updates sent by the publisher computer system and storing a plurality of the utilities in the computer memory, each utility that is associated with a publisher computer comprising a combination of a difference between a current value of a data element and a previous value of the data element, a first value set to indicate that the data element was created and that a previous update indicated it had been removed, and a second value set to indicate that the data element was removed and that the previous update indicated that it existed;

using the one or more processors, determining, for each publisher computer system of the plurality of publisher computer systems, a priority level of the publisher computer system in relation to other publisher computer systems of the plurality of publisher computer systems, using the one or more processors, assigning to each publisher computer system of the plurality of publisher computer systems a publisher limit rate at which the respective publisher computer system sends updates to the subscriber computer system using the offered rate, the utility of updates of the respective publisher computer system, and the priority level of the publisher computer system.

2. The subscriber computer system of claim 1, further comprising instructions which when executed cause:

using the one or more processors, receiving, from each of the publisher computer systems of the plurality of publisher computer systems, one or more updates over a period of time;

using the one or more processors, determining, for each publisher computer system of the plurality of publisher computer systems, an actual rate of updates;

using the one or more processors, determining, for each publisher computer system of the plurality of publisher computer systems, a ratio of the actual rate of updates and the publisher limit rate;

using the one or more processors, whenever the ratio is less than a threshold ratio, assigning to the publisher computer system, an updated publisher limit rate that is less than the offered rate of updates.

3. The subscriber computer system of claim 1, further comprising instructions which when executed cause:

using the one or more processors, receiving, from each of the publisher computer systems of the plurality of publisher computer systems, one or more updates over a period of time;

using the one or more processors, determining, for each publisher computer system of the plurality of publisher computer systems, an actual rate of updates;

using the one or more processors, determining, for each publisher computer system of the plurality of publisher computer systems, a ratio of the actual rate of updates and the publisher limit rate;

using the one or more processors, whenever the ratio is greater than a threshold ratio, assigning to the publisher computer system, an updated publisher limit rate that is upper bounded by a maximum increase in the publisher limit rate.

4. The subscriber computer system of claim 1, further comprising instructions which when executed cause:

using the one or more processors, sending to a publisher computer system of the plurality of publisher computer systems, an instantaneous publisher limit rate of zero.

5. The subscriber computer system of claim 1, further comprising instructions which when executed cause:

using the one or more processors, determining, for each publisher computer system of the plurality of publisher computer systems, an available network bandwidth associated with the publisher computer system;

wherein the publisher limit rate of the publisher computer system is assigned using the available network bandwidth associated with the publisher computer system.

6. The subscriber computer system of claim 1, further comprising instructions which when executed cause:

using the one or more processors, determining, for each publisher computer system of the plurality of publisher computer systems, a quality of service (QoS) class level of the publisher computer system;

wherein the publisher limit rate of the publisher computer system is assigned using the QoS class level of the publisher computer system.

7. A resource allocation method providing an improvement in control of rates at which a plurality of publisher computer systems send digital electronic update messages to the subscriber computer system comprising:

using one or more processors, determining for a subscriber computer system a subscriber limit rate at which the subscriber computer system can process updates received from a plurality of publisher computer systems, and storing the subscriber limit rate in computer memory, wherein each of the updates comprises an electronic digital message received over a computer network;

using the one or more processors, determining, for each publisher computer system of the plurality of publisher computer systems, an offered rate of updates sent to the subscriber computer system and storing a plurality of the offered rates in the computer;

using the one or more processors, determining, for each publisher computer system of the plurality of publisher computer systems, a utility of updates sent by the publisher computer system and storing a plurality of the utilities in the computer memory, each utility that is associated with a publisher computer comprising a combination of a difference between a current value of a data element and a previous value of the data element, a first value set to indicate that the data element was created and that a previous update indicated it had been removed, and a second value set to indicate that the data element was removed and that the previous update indicated that it existed;

using the one or more processors, determining, for each publisher computer system of the plurality of publisher computer systems, a priority level of the publisher computer system in relation to other publisher computer systems of the plurality of publisher computer systems, using the one or more processors, assigning to each publisher computer system of the plurality of publisher computer systems a publisher limit rate at which the respective publisher computer system sends updates to the subscriber computer system using the offered rate, the utility of updates of the respective publisher computer system, and the priority level of the publisher computer system.

8. The resource allocation method of claim 7, further comprising:

using the one or more processors, receiving, from each of the publisher computer systems of the plurality of publisher computer systems, one or more updates over a period of time;

using the one or more processors, determining, for each publisher computer system of the plurality of publisher computer systems, an actual rate of updates;

using the one or more processors, determining, for each publisher computer system of the plurality of publisher computer systems, a ratio of the actual rate of updates and the publisher limit rate;

using the one or more processors, whenever the ratio is less than a threshold ratio, assigning to the publisher computer system, an updated publisher limit rate that is less than the offered rate of updates.

9. The resource allocation method of claim 7, further comprising:

using the one or more processors, receiving, from each of the publisher computer systems of the plurality of publisher computer systems, one or more updates over a period of time;

using the one or more processors, determining, for each publisher computer system of the plurality of publisher computer systems, an actual rate of updates;

using the one or more processors, determining, for each publisher computer system of the plurality of publisher computer systems, a ratio of the actual rate of updates and the publisher limit rate;

using the one or more processors, whenever the ratio is greater than a threshold ratio, assigning to the publisher computer system, an updated publisher limit rate that is upper bounded by a maximum increase in the publisher limit rate.

10. The resource allocation method of claim 7, further comprising:

using the one or more processors, sending to a publisher computer system of the plurality of publisher computer systems, an instantaneous publisher limit rate of zero.

11. The resource allocation method of claim 7, further comprising:

using the one or more processors, determining, for each publisher computer system of the plurality of publisher computer systems, an available network bandwidth associated with the publisher computer system;

wherein the publisher limit rate of the publisher computer system is assigned using the available network bandwidth associated with the publisher computer system.

12. The resource allocation method of claim 7, further comprising:

using the one or more processors, determining, for each publisher computer system of the plurality of publisher computer systems, a quality of service (QoS) class level of the publisher computer system;

wherein the publisher limit rate of the publisher computer system is assigned using the QoS class level of the publisher computer system.

* * * * *